US012045336B2

(12) United States Patent
Van Nieuwenhuyze et al.

(10) Patent No.: US 12,045,336 B2
(45) Date of Patent: Jul. 23, 2024

(54) EMBEDDED SECURE ELEMENT

(71) Applicants: STMicroelectronics S.r.l., Agrate Brianza (IT); Proton World International N.V., Diegem (BE)

(72) Inventors: Olivier Van Nieuwenhuyze, Wezembeek-Oppem (BE); Amedeo Veneroso, Caserta (IT)

(73) Assignees: STMicroelectronics S.r.l., Agrate Brianza (IT); Proton World International N.V., Diegem (BE)

( * ) Notice: Subject to any disclaimer, the term of this patent is extended or adjusted under 35 U.S.C. 154(b) by 329 days.

(21) Appl. No.: 17/479,275

(22) Filed: Sep. 20, 2021

(65) Prior Publication Data

US 2022/0004625 A1 Jan. 6, 2022

Related U.S. Application Data

(63) Continuation-in-part of application No. PCT/EP2020/058434, filed on Mar. 25, 2020.

(30) Foreign Application Priority Data

Mar. 26, 2019 (FR) .................................... 1903168
Sep. 25, 2020 (FR) .................................... 2009751
Sep. 25, 2020 (FR) .................................... 2009752

(51) Int. Cl.
*G06F 21/53* (2013.01)
*G06F 12/0842* (2016.01)
(Continued)

(52) U.S. Cl.
CPC .......... *G06F 21/53* (2013.01); *G06F 12/0842* (2013.01); *G06F 12/14* (2013.01); *G06F 13/1657* (2013.01); *G06F 2221/034* (2013.01)

(58) Field of Classification Search
CPC ...... G06F 21/53; G06F 12/0842; G06F 12/14; G06F 13/1657; G06F 2221/034
See application file for complete search history.

(56) References Cited

U.S. PATENT DOCUMENTS 6,220,510 B1 * 4/2001 Everett ............ G06Q 20/35765
705/41
9,817,756 B1 11/2017 Jorgensen
(Continued)

FOREIGN PATENT DOCUMENTS

EP 1524597 A1 4/2005

OTHER PUBLICATIONS

Liu, Duo, et al., "Non-Volatile Memory Based Page Swapping for Building High-Performance Mobile Devices", IEEE Transactions on Computers, vol. 66, No. 11, Nov. 2017, pp. 1918-1931.
(Continued)

*Primary Examiner* — Darshan I Dhruv
(74) *Attorney, Agent, or Firm* — Slater Matsil, LLP (57) ABSTRACT

An embedded electronic system includes a volatile memory and a processor configured to execute a low-level operating system that manages allocation of areas of the volatile memory to a plurality of high-level operating systems. Each high-level operating system executes one or more of applications. The volatile memory includes a first portion reserved for execution data of a first application and a second portion intended to store execution data of a second application. The system is configured so that once the execution data of the first application are loaded in the first portion, the low-level operating system forbids unloading of the execution data of the first application from the first portion so that the execution data of the first application remain in the volatile memory in case of a deactivation or of a setting to standby of the first application.

24 Claims, 6 Drawing Sheets

(51) Int. Cl.
*G06F 12/14* (2006.01)
*G06F 13/16* (2006.01)

(56) References Cited

U.S. PATENT DOCUMENTS

| | | |
|---|---|---|
| 2004/0206981 A1 | 10/2004 | Gross et al. |
| 2006/0133362 A1 | 6/2006 | Stein et al. |
| 2007/0177611 A1 | 8/2007 | Armstrong et al. |
| 2012/0047313 A1 | 2/2012 | Sinha et al. |
| 2012/0331281 A1* | 12/2012 | Borras ................ G06F 1/3275 713/2 |
| 2013/0297924 A1* | 11/2013 | Laue .................... G06F 9/441 713/2 |
| 2013/0332660 A1 | 12/2013 | Talagala et al. |
| 2015/0113257 A1* | 4/2015 | Lewis ................. G06F 9/4806 713/1 |
| 2015/0199509 A1* | 7/2015 | Wille .................... G06F 21/74 726/16 |
| 2015/0378942 A1 | 12/2015 | Bradbury et al. |
| 2016/0062784 A1* | 3/2016 | Chai .................. H04W 12/086 718/1 |
| 2017/0269863 A1* | 9/2017 | Wada ................... G06F 3/0679 |
| 2017/0317832 A1* | 11/2017 | Surdu .................. H04L 9/3234 |
| 2017/0357450 A1* | 12/2017 | Barbou-Des-Places .................... G06F 9/445 |
| 2018/0113817 A1* | 4/2018 | Banginwar ............ G06F 9/485 |
| 2018/0165008 A1 | 6/2018 | Baysah et al. |

OTHER PUBLICATIONS

Kursawe, Klaus, et al., "Flexible μ TPMs through Disembedding", Proceedings of the 4th International Symposium on Information, Computer, and Communications Security, Mar. 10, 2009, pp. 116-124.

Kim, Seungkyun, et al., "Demand Paging Techniques for Flash Memory Using Compiler Post-Pass Optimizations", ACM Transactions on Embedded Computing Systems, vol. 10, No. 4, Article 40, Nov. 2011, 29 pages.

Han, Junyeong, et al., "A Hybrid Swapping Scheme Based On Per-Process Reclaim for Performance Improvement of Android Smartphones", IEEE Access, vol. 6, Oct. 1, 2018, 10 pages.

* cited by examiner

EMBEDDED SECURE ELEMENT

CROSS-REFERENCE TO RELATED APPLICATIONS

This application is a continuation-in-part of PCT/EP2020/058434, filed Mar. 25, 2020, which claims the benefit of French application FR1903168, filed Mar. 26, 2019. This application also claims the benefit of French application FR2009751, filed Sep. 25, 2020 and French application FR2009752, filed on Sep. 25, 2020. All of these are hereby incorporated by reference to the maximum extent allowable by law.

TECHNICAL FIELD

The present disclosure generally concerns electronic systems and, more particularly, embedded electronic systems. The present disclosure more particularly concerns the use of memories in an embedded electronic system.

BACKGROUND

An embedded electronic system is a self-contained electronic and software system capable of being embedded in an electronic device and/or electronic equipment.

The design issues of an embedded system are frequently due to management constraints of memories internal or external to the embedded system. The system may comprise non-volatile memories, rewritable or not, and volatile memories, each capable of storing data of different types with the constraints and assets specific to each type of memory. The management of these memories generates constraints in terms of data security, particularly when the system is used for different applications.

US 2018/0113817 discloses a virtualization-based platform protection technology in which two memories are used for different applications.

US 2018/0165008 discloses a memory transaction prioritization technology.

US 2015/0113257 discloses a system and method for dual OS memory switching, in which an application replaces the other in volatile memory. In response to a switching event from a first OS loaded into volatile memory to a second OS, device firmware saves content of overlapped memory location being used for the first OS in volatile memory to non-volatile memory and loads contents of second OS to overlapped memory locations in volatile memory.

EP 1 524 597 discloses a method for managing threads in a memory-constrained system.

It would be desirable to at least partly improve certain aspects of known embedded electronic systems, more particularly to at least partly improve certain aspects of the use of memories in embedded electronic systems.

It would be desirable to at least partly improve certain aspects of known embedded electronic systems, more particularly to at least partly improve certain aspects of the use of memories in embedded electronic systems.

SUMMARY

There is a need for embedded systems capable of managing a plurality of applications independently from one another.

There more particularly is a need for embedded systems where the use of the memories is optimized.

An embodiment of a first aspect provides an embedded electronic system comprising:
at least one volatile memory; and
at least one low-level operating system managing the allocation of areas of the volatile memory to a plurality of high-levels operating systems each comprising one or a plurality of applications,
wherein the volatile memory comprises:
at least a first portion reserved to execution data of a first application; and
at least a second portion intended to store execution data of at least a second application,
the execution data of the first application remaining in the volatile memory in case of a deactivation or of a setting to standby of this first application.

An embodiment of the first aspect provides a method implemented by an embedded electronic system comprising:
at least one volatile memory; and
at least one low-level operating system managing the allocation of areas of the volatile memory to a plurality of high-levels operating systems, each comprising one or a plurality of applications,
wherein the volatile memory comprises:
at least a first portion reserved to execution data of a first application; and
at least a second portion intended to store execution data of at least a second application,
the execution data of the first application remaining in the volatile memory in case of a deactivation or of a setting to standby of this first application.

According to an embodiment of the first aspect, data of execution of one of a plurality of tasks of an application are partly transferred, by the low-level operating system, from the volatile memory to a non-volatile memory when the execution of the task is interrupted by the execution of at least one task of another application.

According to an embodiment of the first aspect, a volatile memory area is allocated to the second application while is it not executed, the execution data of this second application being transferred into the non-volatile memory if the available volatile memory size is not sufficient for the execution of a third application.

An embodiment of a second aspect provides an embedded electronic system comprising:
at least one volatile memory;
at least one low-level operating system managing the allocation of volatile memory areas to a plurality of high-level operating systems, each comprising one or a plurality of applications,
wherein execution data of one or a plurality of tasks of the first application are partly transferred, by the low-level operating system, from the volatile memory to a non-volatile memory when the execution of the task of the first application is interrupted by the execution of at least one task of a second application.

An embodiment of the second aspect provides a method implemented in an embedded electronic system comprising:
at least one volatile memory;
at least one low-level operating system managing the allocation of volatile memory areas to a plurality of high-level operating systems, each comprising one or a plurality of applications,
wherein execution data of one or a plurality of tasks of the first application are partly transferred, by the low-level operating system, from the volatile memory to an area of a non-volatile memory when the execution of the task of the first application is interrupted by the execution of at least one task of a second application.

According to an embodiment of the second aspect, wherein a volatile memory area is allocated to the first application while it is not executed, the data of this first application being transferred to the non-volatile memory if the available volatile memory size is not sufficient for the execution of a second application.

According to an embodiment of one or the other of the aspects, the applications of a high-level operating system do not have access to the volatile memory areas allocated to the applications of another high-level operating system.

According to an embodiment of one or the other of the aspects, a memory management function or unit executed by the low-level operating system forbids the access of the execution data of an application to other applications.

According to an embodiment of the first aspect, the memory management function or unit adapts the size of the first and second portions of the volatile memory according to the needs of the different applications.

According to an embodiment of one or the other of the aspects, the execution data of a plurality of applications are simultaneously present in the volatile memory.

According to an embodiment of one or the other of the aspects, the non-volatile memory is external to the embedded electronic system.

According to an embodiment of one or the other of the aspects, an execution code of an application is transferred to the volatile memory for its execution.

According to an embodiment of one or the other of the aspects, the non-volatile memory is internal to the embedded electronic system.

According to an embodiment of one or the other of the aspects, an execution code of an applications remains in the non-volatile memory during the execution of a task.

According to an embodiment of one or the other of the aspects, a non-volatile memory area allocated to a high-level operating system is seen by the latter as a volatile working memory.

According to an embodiment of one or the other of the aspects, the high-level operating systems manage a virtual image of the memories where the volatile and non-volatile memories are one and the same.

According to an embodiment of one or the other of the aspects, during its execution, a main task of an application is allocated a volatile memory area.

According to an embodiment of one or the other of the aspects, when an application is executed, part of its execution data if transferred into the volatile memory when the application need specifically of the one that are not yet loaded into the volatile memory.

An embodiment provides an embedded secure element, configured for the implementation of the described system or method.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For clarity, only those phases and elements which are useful to the understanding of the described embodiments have been shown and are detailed.

Unless specified otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
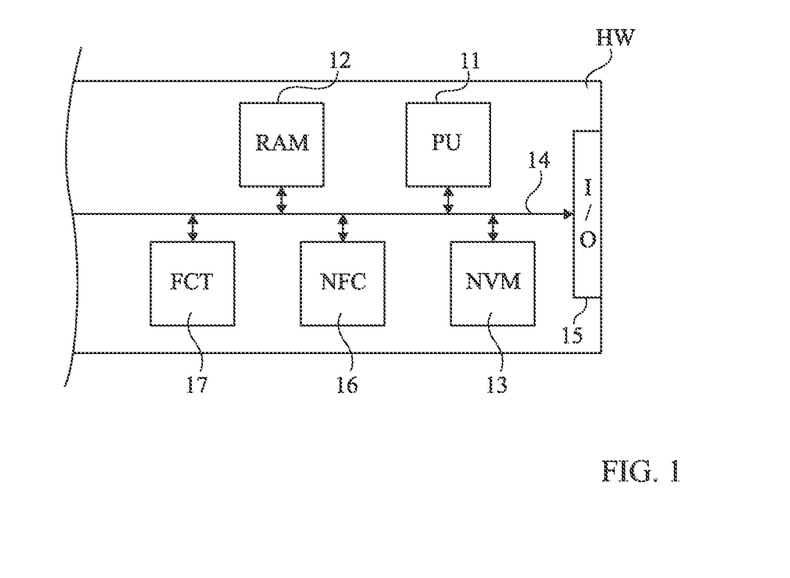
FIG. 1 schematically shows in the form of blocks an embodiment of hardware components of an embedded secure element or embedded electronic system.

FIG. 1 very schematically shows in the form of blocks an embodiment of hardware components HW (Hardware) of an embedded secure element E or embedded electronic system.

Element E is made in the form of an electronic circuit comprising, in hardware form:
  one or a plurality of digital processing units (PU) 11, for example, such as a state machine, a microprocessor or a central processing unit (CPU), a programmable logic circuit, etc.;
  one or a plurality of volatile (RAM) and/or non-volatile (NVM) data and program storage memories 12, 13;
  one or a plurality of data, address, and/or control buses 14 between the different elements internal to circuit 1;
  one or a plurality of input/output interfaces 15, (I/O) of wired or wireless communication with the outside of circuit 1;
  one or a plurality of communication circuits, for example, a near-field communication circuit 16 (NFC); and
  various other circuits according to the application, symbolized in FIG. 1 by a block 17 (FCT), for example, a short distance communication device, for example using the Bluetooth standard, biometric sensors, etc.

Figure 2:
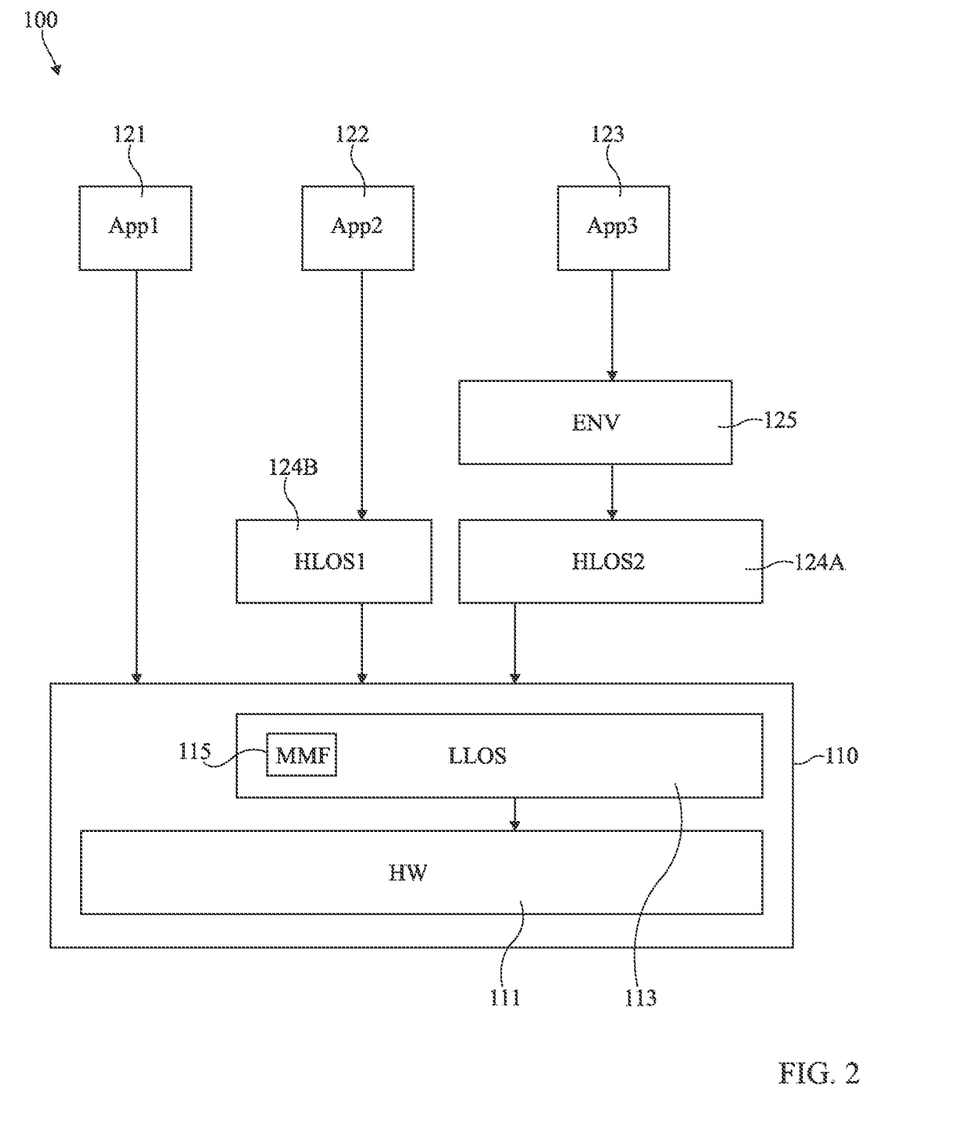
FIG. 2 very schematically shows in the form of blocks a software architecture of an embedded electronic system.

FIG. 2 schematically shows in the form of blocks a software architecture 100 of an embedded secure element E, or secure embedded electronic system.

Software architecture 100 is implemented by the hardware components HW of the secure element E described in FIG. 1.

Architecture 100 comprises a primary platform 110, generally called virtual primary platform (VPP) comprising the access to the electronic components 111 (HW) of secure element E and comprising one or a plurality of low-level operating systems 113 (LLOS).

Low-level operating systems 113 are operating systems enabling to ease the communication between one or a plurality of high-level operating systems (HLOS1, HLOS2, HLOS) 124A, 124B (two high-level operating systems in the case illustrated in FIG. 1) of secure element E and the components 111 of element E. As an example, the low-level operating systems comprise software driving components 111.

A low-level operating system 113 is formed of an execution code (or executable code) and of execution data. The execution code contains instructions enabling to execute functions of the program. By definition, the instructions are invariable for a given program, except for an update of the program, which then modifies the instructions. The execution data are used by the execution code to contextualize the execution and perform the desired function. The execution data may be distributed in two categories. So-called "temporary" execution data and so-called "permanent" or "fixed" execution data. For example, if the function comprises the verification of a PIN code, this function is broken down in three portions, the execution code contains instructions of verification of the PIN code while the permanent execution data contain the reference PIN code and the number of remaining tests and the temporary execution data contain the PIN code submitted to the verification.

In an embedded secure element, the low-level system manages the memory components of the element, that is, the physical memories, volatile 12 (FIG. 1) and non-volatile (13 (rewritable or not).

High-level operating systems 124A and 124B use virtual images of the memories available for the management of the execution codes and of the execution data. Due to this technique, high-level operating systems do not have a direct access to the management of physical memories, be they volatile or non-volatile. In other words, in the described embodiments, high-level operating systems manage a virtual image of the memories where the volatile and non-volatile memories are confounded. The management of the physical distribution in the volatile and non-volatile memories is ensured by the low-level operating system(s).

Platform no has, according to the described embodiments, particularly the roles of;
- defining a low-level operating system between the hardware components (HW), particularly the processor and the memories, and the high-level operating systems and applications that they execute;
- managing the exchanges between the high-level operating systems and the hardware components;
- implementing a function (firewall) preventing interactions between high-level operating systems; and
- enabling to share same hardware components of the secure elements between a plurality of high-level operating systems while ascertaining that a single one is active at a given time.

Low-level operating system 113 uses a memory management function (MMF) 115 to control or manage the access of the high-level operating systems to the physical memories by linking the virtual memories and the physical memories according to the needs and requests of high-level operating systems 124A and 124B. More particularly, low-level operating systems 113, by using memory management function 115 (MMF), implement the isolation of high-level operating systems 124A and 124B from one another and manage the access of high-level operating systems 124A, 124B to the different memories. For example, low-level operating systems 113 may manage data stored in the memories and more particularly manage the access to these data, especially in the case where a plurality of high-level operating systems are present in secure element E. Low-level operating systems 113 may for example forbid the access to certain data to a high-level operating system.

Architecture 100 further comprises applications capable of being implemented by primary platform no. Such applications are for example capable of processing control signals originating from communication interfaces, such as for example a bank transaction using a near-field communication device. Each of these applications is implemented by means of fixed data forming the application, for example, instructions, code lines, or permanent data such as user data such as an identifier, and of temporary data, execution data, or variable data such as data stacks, temporary cipher keys. The execution data of an application are data used by the application only during its execution and which are not kept once the execution of the application has ended.

More particularly, an application implements one or a plurality of tasks, each task for example being a succession of instructions. The implementation of a task generates execution data. Certain execution data may be used by different tasks of the application while other may only be used by a single task. It is considered that an application may only implement a single task at a time.

Thus, in the following description, the task which is being executed by the application is called "main task" and the other tasks of the application which are not being executed are called "secondary tasks". The execution tasks are for example tasks which have not been implemented yet and which have not enabled to generate execution data, or tasks which have already been implemented but which have been, for example, interrupted (and paused), and which thus have already enabled to generate execution data. Thus, in the following description, execution data relative to the main task can be distinguished from execution data relative to the secondary tasks.

The applications may be of different types, for example, a SIM (Subscriber Identity Module) application, a payment application, an application enabling to validate a public transport ticket, etc.

According to an example of application type, an application 121 (App1) is capable of being directly implemented by primary platform 110. Application 121 is for example an application enabling to perform payments by communicating with a near-field communication (NFC) device.

According to another type of application, an application 122 (App2) is capable of sending control signals to primary platform 110 via one of the high-level operating systems, for example, operating system 124B. This high-level operating system may for example be one of the operating systems of secure element E exchanging control signals with primary platform 110. As a variant, it may also be considered that the high-level operating system as well as all the applications attached thereto are an application adapted to being implemented by primary platform 110.

According to another example of application type, an application 123 (App3) is adapted to sending commands to primary platform 110 via an execution environment 125 (ENV) and one of the high-level operating systems, for example operating system 124A. The operating environment is for example of Java or JavaCard type. As a variation, it can also be considered that the operating system, as well as all the applications which are attached thereto, are an application capable of being implemented by primary platform 110.

To implement these different applications 121, 122, 123, operating systems 124A, 124B, and execution environment 125, the components 111 of secure element E more particularly comprise at least one non-volatile memory and at least one volatile memory. The non-volatile memory is generally used to store fixed data and the execution code of one or a plurality of applications. The volatile memory is generally used to store the execution data of one or a plurality of applications. In the case where the fixed data and the execution data of a plurality of applications are stored at the same time in the volatile memory and in the non-volatile memory, there exists a protection, for example, a protection software and/or a firewall mechanism, enabling to prevent an application from accessing the fixed data and the execution data of another application. This function is, as previously indicated, implemented by a memory management function 115 MMF or memory management unit (MMU). Function 115 enables to link the "virtual" memory known by the application and the physical memories (volatiles and non-volatile). The high-level operating systems (124A and 124B) do not "directly" have access to the physical memory management. They use a virtual image of this memory. However, the management of this virtual image or virtual memory is divided to enable the high-level operating systems (124A and 124B) to manage the execution codes, as well as the fixed data or the execution data according to their nature. The high-level operating systems are indeed those which manage their data and not the low-level operating systems. The low-level operating systems and the memory management function achieve the correspondence between the virtual execution data (the virtual memory) and their storage in the physical memory.

According to an embodiment, at least one area or portion of the non-volatile memory is used as a working memory. In other words, this area of the non-volatile memory operates, as seen from the high-level applications, as a volatile memory, to store temporary data used by the applications during their operation. The non-volatile memory may be internal or external to secure element E (internal or external to circuit HW). According to whether the non-volatile memory (its area used as a working memory by the high-level operating systems) is internal or external to the secure element, the management of this memory differs during the execution of a high-level operating system.

In the case where the non-volatile memory is internal to secure element E, the high-level operating system may be directly executed from the memory where the operating system is located (is loaded). It is spoken of an "in place" execution (XIP). Generally, the low-level operating systems then enable to manage the execution of a plurality of high-level operating systems. In the case where an application is executed "in place", the instruction portion (the execution code) of the application remains in the non-volatile memory; the execution data (permanent and temporary) may then be displaced into the working memory (non-volatile memory).

Conversely, if the non-volatile memory is external to secure element E, the "in place" execution is not possible. The management of the non-volatile memory implies a displacement of all or part of the high-level operating system into a volatile memory internal to the secure element. In this case, the low-level operating system may authorize or not the management of the execution of a plurality of high-level operating systems in its internal memory.

Further, it is considered that an application may be in at least three different states:
- an active or state of execution (running) by primary platform no;
- a standby state, that is, its execution is interrupted but it can be resumed at any time; and
- an inactive or deactivated state, that is, its execution cannot be restarted without one or a plurality of previous operations.

When an application leaves the standby state to be executed again, it resumes its execution where it had stopped. It does not need to use a specific routine to continue its processing. From the point of view of the application, all appears as if the application had not been interrupted.

More particularly, when an application is being executed, all or part of the data relative to its main task are stored in the volatile memory of the circuit and are used for the implementation of the application. The data relative to secondary tasks of the application may be stored in the volatile memory or in the working memory (non-volatile). As a variant, certain execution data (permanent or temporary) relative to the main task may be located in the working memory (non-volatile) and be loaded into the volatile memory when the main task requires it.

When an application is at standby, the data relative to its main task are stored in the volatile memory and are not being used for the implementation of the application. The data relative to secondary tasks of the application may be stored in the volatile memory or in the working memory. An application may further be at standby if its execution is interrupted by the execution of another application which may be located in a different high-level operating system. In this case, all the tasks of the application at standby are considered as being secondary tasks since none is executed. Thus, when an application is at standby because another application is running, all its data are physically located either in a dedicated area of the volatile memory which is not accessible to the other operating systems, or in the non-volatile memory. This management is performed by memory management function 115. However, as seen from the application (from the high-level operating system), the temporary data are in a working memory assimilated, by the virtual image used by this operating system, to a volatile memory. According to another embodiment, the execution data of a plurality of different applications of a plurality of different high-level operating systems are located at the same time in the volatile memory. In this case, each application only has access to its own data and does not have access to the data of the other application(s). By the use of the low-level system and of the memory management function, the applications are not aware of the presence of data of other applications in the volatile memory.

When an application is deactivated, all its data (be they relative to a main task or to a secondary task) are stored in memory in the same way as for an application at standby.

FIGS. 3 to 6 illustrate different implementations of applications of secure element E, and more particularly the use of the volatile and non-volatile physical (working) memories.

It could have been devised to let the high-level operating systems directly manage volatile and non-volatile memories 12 and 13. However, certain transactions operated by certain applications (for example, near-field transactions, NFC) require a rapidity of execution incompatible with the management of a non-volatile memory by a high-level operating system. The fact of transferring this management to the low-level operating system and of making the high-level operating system "believe" that it transfers its data into a volatile memory accelerates the process.

Figure 3A:
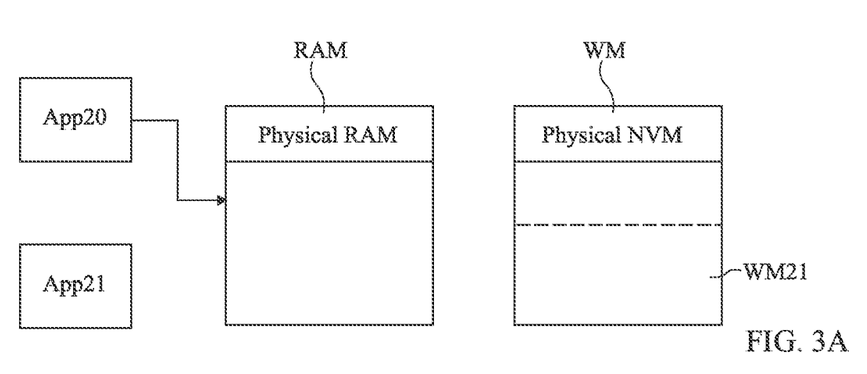
FIGS. 3A, 3B and 3C, collectively FIG. 3, schematically illustrate in the form of blocks the implementation of a method of execution of applications of the embedded electronic system of FIGS. 1 and 2.
Figure 3B:
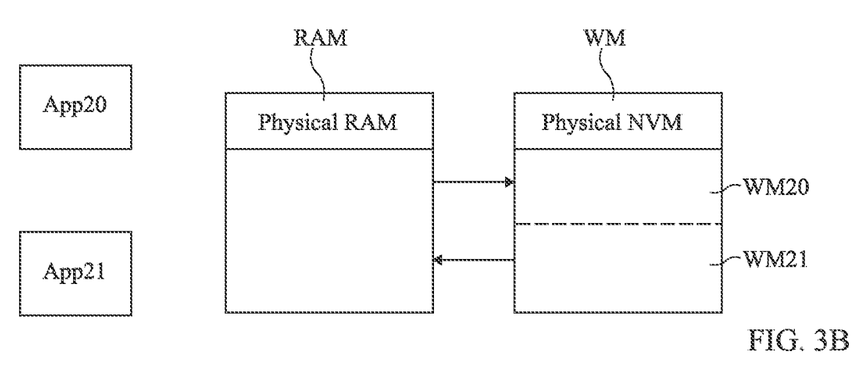
Figure 3C:
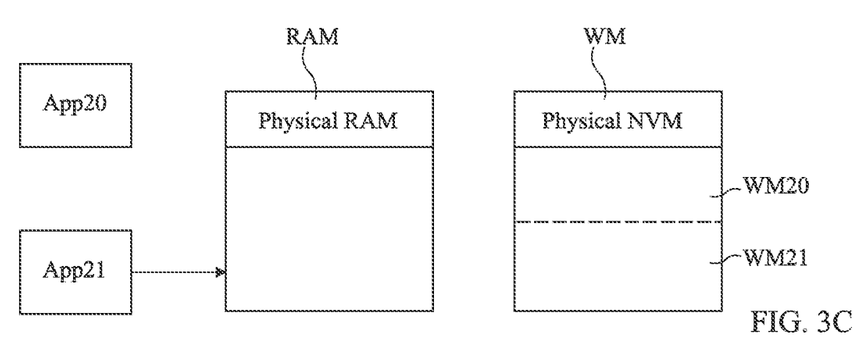

FIG. 3 comprises three views in FIGS. 3A, 3B and 3C), each illustrating a phase of an implementation of a method of execution of applications App20 and App21 of the secure element E described in relation with FIGS. 1 and 2. These three views more particularly illustrate the use of working memory WM using the non-volatile memory (Physical NVM), considered by the applications as a volatile memory, and of the real volatile memory RAM (Physical RAM), of secure element E during the execution of applications App20 and App21.

Applications App20 and App21, according to their implementation, may be located in a same high-level operating system or in two different high-level operating systems.

According to the example described in FIG. 3, it is assumed that application App21 is deactivated but has already been started before the starting of application App20. The execution data relative to the main and secondary tasks of application App21 are stored in an area W21 of non-volatile working memory WM.

Application App20 is also deactivated but has never been started. It thus has not generated execution data yet.

In a first phase (FIG. 3A), application App20 is started by secure element E. More particularly, application App20 is started by low-level operating system 113. Application App20 is then running. Execution data, relative to the main task of application App20, are downloaded or loaded into volatile memory RAM.

All along its execution, and if it is not interrupted by the execution of another application, application App20 stores its execution data in volatile memory RAM.

At a second phase (FIG. 3B), it is assumed that application App21, deactivated up to now, asks to be executed by secure element E.

The execution data relative to the main task and, possibly, to secondary tasks, of application App20, present in volatile memory RAM are transferred and stored into an area WM20 of non-volatile working memory WM and are suppressed from volatile memory RAM. Thus, the current state of application App20 is saved in memory WM, seen by application App20 as a volatile memory, and application App20 then becomes deactivated.

Execution data relative to application App21 previously stored in area WM21 are loaded into volatile memory RAM. Thus, the use of application App21 may resume where it had previously stopped. In other words, application App21 passes from a deactivated state to a "running" state.

In a third phase (FIG. 3C), application App21 keeps on running, and modifies in volatile memory RAM its execution data relative to its main task and, possibly, to secondary tasks. Data are for this purpose transferred from non-volatile working memory WM to volatile memory RAM.

Figure 4A:
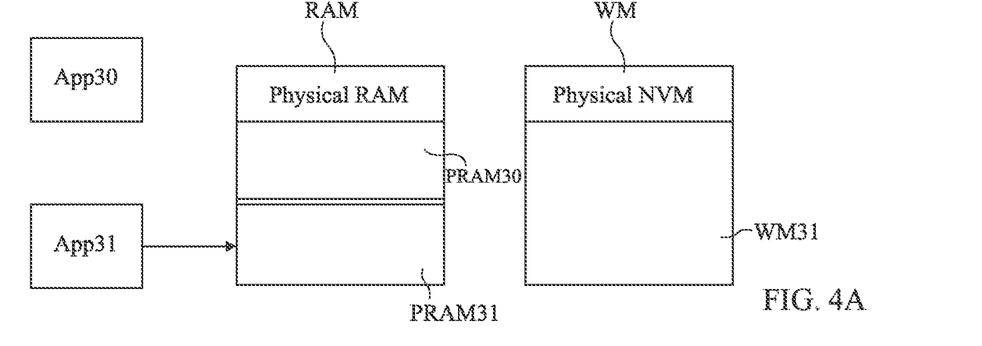
FIGS. 4A, 4B and 4C, collectively FIG. 4, schematically illustrate in the form of blocks an implementation mode of a method of execution of applications of the embedded electronic system of FIGS. 1 and 2.
Figure 4B:
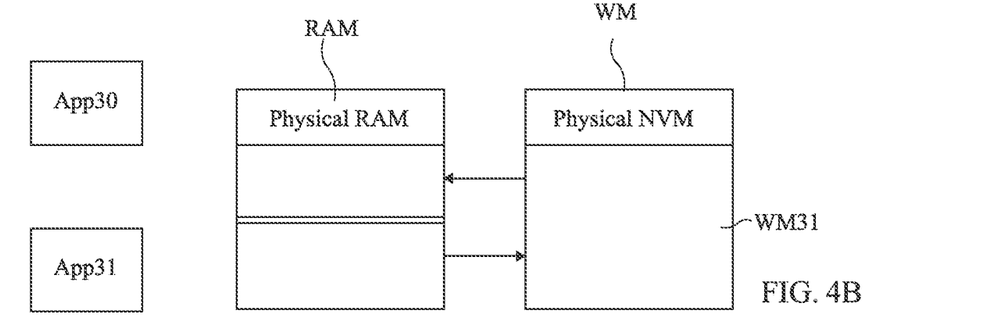
Figure 4C:
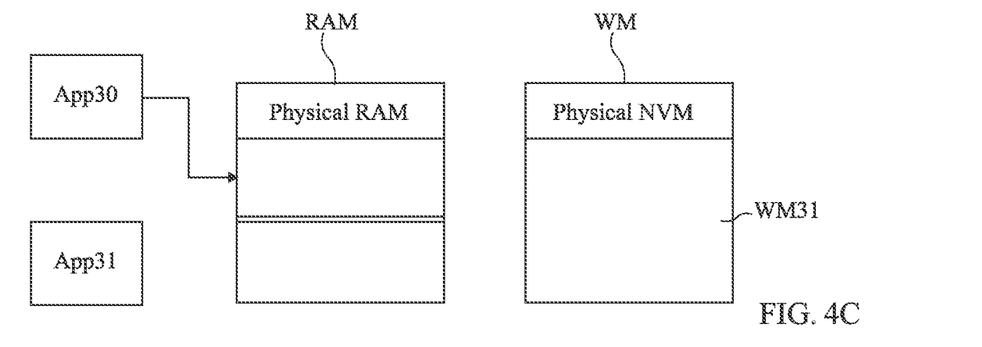

FIG. 4 comprises three views in FIGS. 4A-4C, each illustrating applications App30 and App31 of the secure element E described in relation with FIGS. 1 and 2. These three views more particularly illustrate the use of non-volatile working memory WM and of a volatile memory RAM of secure element E during the activation of applications App30 and App31.

Applications App30 and App31, according to their implementation, may be located in a same high-level operating system or in two different high-level operating systems.

According to an embodiment, application App30 is a frequent-use application, or resident application, or implements a frequent-use task, or resident task. The fact of considering an application as being "frequent" is decided, requested, and/or indicated by the high-level operating system which hosts the application. The execution data relative to resident application App30 are stored in a reserved area PRAM30 of volatile memory RAM. The area (or physical address range) PRAM30 of memory RAM is always available to store the execution data of application App30, and the execution data of one or of other applications cannot be stored therein.

It is assumed that application App30 is active and running.

In a first phase (FIG. 4A), application App30 is set to standby. Execution data relative to the main task of application App30 are stored in area PRAM30. The main task of application App30 is for example a resident task.

Application App31 is then started by secure element E. Execution data, relative to the main task and, possibly, to secondary tasks, of application App31 are downloaded or loaded into an area PRAM31 of volatile memory RAM. Area PRAM31 is distinct from area PRAM30. Application App31 is then running.

All along its execution, and if it is not interrupted by the execution of another application, application App31 stores its execution data in area PRAM31 of volatile memory RAM.

In a second phase (FIG. 4B), resident application App30, at standby up to then, requests being run by secure element E, more particularly, by low-level operating system 113.

If the capacity of the volatile memory is not sufficient to contain the execution data of areas App30 and App31, the execution data relative to application App31, present in area PRAM31 of volatile memory RAM, are then transferred into an area WM31 of non-volatile working memory WM. Thus, the current state of application App31 is saved in working memory WM and application App31 is then deactivated. This situation may also occur if two applications are already present in the volatile memory and a third application requests to be executed.

In a third phase (FIG. 4C), execution data relative to the main task of application App30, already present in the area PRAM30 of volatile memory RAM dedicated to application 30, may be directly processed. Thus, the use of application App30 may resume where it had previously stopped. Application App30 is then running. Such mechanism allows the App30 to forbid the transfer of some execution data (under its control) if there is not enough place to execute the App31.

An advantage of this embodiment is that a frequent-use application, or resident application, is guaranteed to have space in physical volatile memory PRAM to store its execution data therein. In the case where the size of the resident volatile memory requested by a new resident application which should be activated would be greater than the size of physical volatile memory PRAM, its activation would be denied until memory PRAM is freed, or the available size of memory PRAM is sufficient, or the size of the so-called resident memory requested by the application to be activated is compatible with the available size of memory PRAM. This case may occur if a plurality of resident applications is activated.

In the embodiment of FIG. 4, both applications are running in a secure environment (both are executed by the secure element—In some embodiments, data may be copied into an external non-volatile memory for the application that are not executed, but the execution is always inside the secure element). Furthermore, application App30, which is considered as frequently used or resident benefits from an allocated or reserved area in volatile memory. In other words, according to this embodiment, an application (here App30), which is considered as a priority application, can claim the fact not to be unloaded from the physical volatile memory and that its execution data (or part of them) stay in this physical volatile memory, even in standby and when another application (here App 31) needs to be executed. The management, by the low-level operating system, of the allocation of a dedicated portion of the volatile memory to a given application is configured based on a request sent by this given application at first loading (or in its mapping definition or its memory image). This information related to this App30 may be unloaded from this physical volatile memory only if the application is deactivated (or deleted).

An advantage is to avoid downloading the execution data of the priority application from the volatile memory to the non-volatile memory, which allows a fast activation of the priority application, while allowing another application to use the rest of the volatile memory.

Figure 5A:
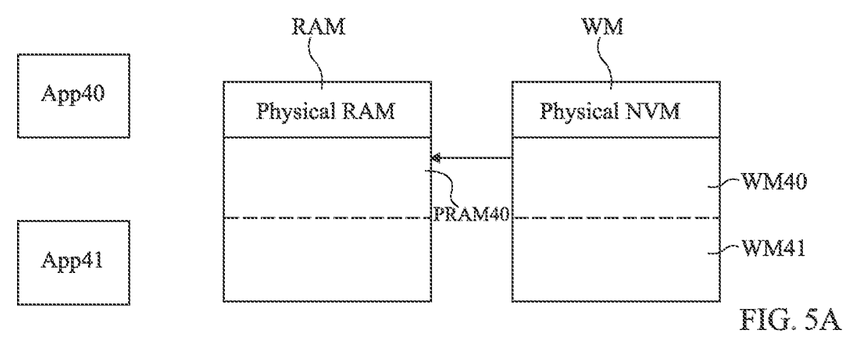
FIGS. 5A, 5B and 5C, collectively FIG. 5, schematically illustrate schematically illustrating in the form of blocks the implementation of a method of execution of applications of the embedded electronic system of FIGS. 1 and 2.
Figure 5B:
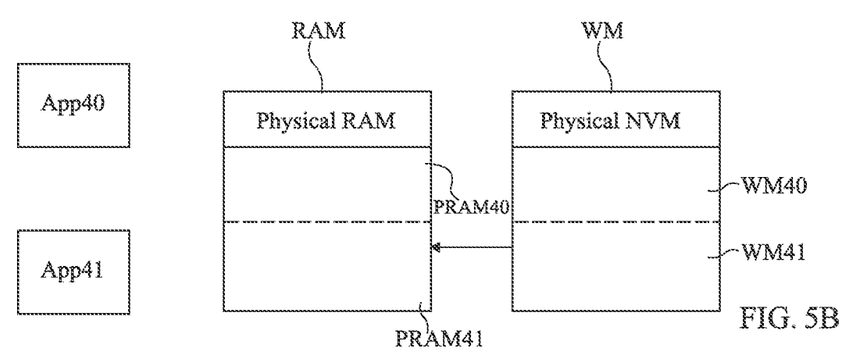
Figure 5C:
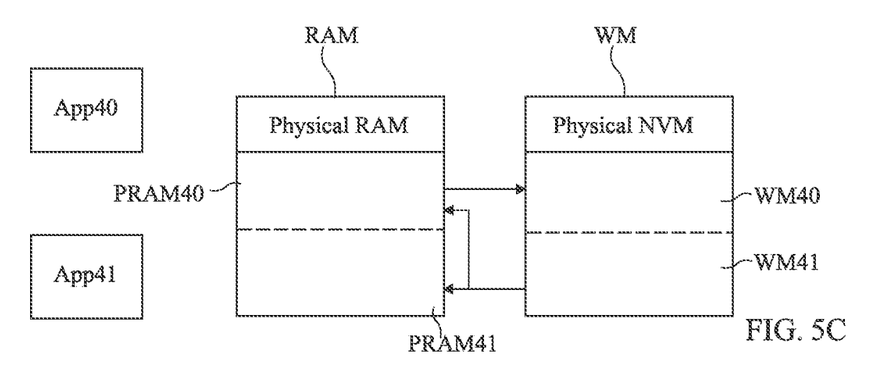

FIG. 5 comprises three views in FIGS. 5A-5C, each illustrating a phase of an implementation of a method of execution of applications App40 and App41 of the secure element E described in relation with FIGS. 1 and 2. These three views more particularly illustrate the use of the non-volatile working memory WM and of the volatile memory RAM of secure element E during the activation of applications App40 and App41.

Applications App40 and App41, according to their implementation, might be located in a same high-level operating system or in two different high-level operating systems.

It is assumed that applications App40 and App41 have already been previously started or executed by secure element E, but are now at standby or inactive. All the execution data relative to the starting and to the operation of applications App40 and App41 are then stored in, respectively, areas WM40 and WM41 of non-volatile working memory WM.

In a first phase (FIG. 5A), application App40 requests being run by secure element E, and then becomes "running". Starting and operation execution data relative to application App40 are transferred, downloaded, or loaded into an area PRAM40 of volatile memory RAM, from area WM40 of non-volatile working memory WM, when the main task of application App40 needs it.

In a second phase (FIG. 5B), application App41 requests in turn being run by secure element E. The execution data relative to the main task of application App41 are transferred, downloaded, or loaded into an area PRAM41 of volatile memory RAM, from area WM41 of non-volatile working memory WM. The data are stored after the execution data relative to application App40 in volatile memory RAM. Application App41 then is running, and application App40 is then at standby.

In a third phase (FIG. 5C), application App41 is still run by secure element E, but volatile memory RAM has no further space available to store additional execution data relative to this application App41. Execution data relative to secondary tasks of application App40, present in area PRAM40, are then transferred or displaced to area WM40 of non-volatile memory WM to free storage space in volatile memory RAM.

It should be noted that the two applications stay present in the volatile memory, i.e., a first application is not unloaded from the volatile memory to the non-volatile memory before execution of a second application. Only part of the execution data of the first application are potentially transferred to the non-volatile memory in case space is missing. This constitutes an important difference with respect to US2015/0113257.

There may also occur for data of application App41 to be transferred into the working memory, for example, if all the execution data of application App40 have already been transferred into the working memory but the capacity of the volatile memory is not sufficient for all the execution data of application App41. In this case, the less used or oldest data are transferred into the working memory.

Figure 6A:
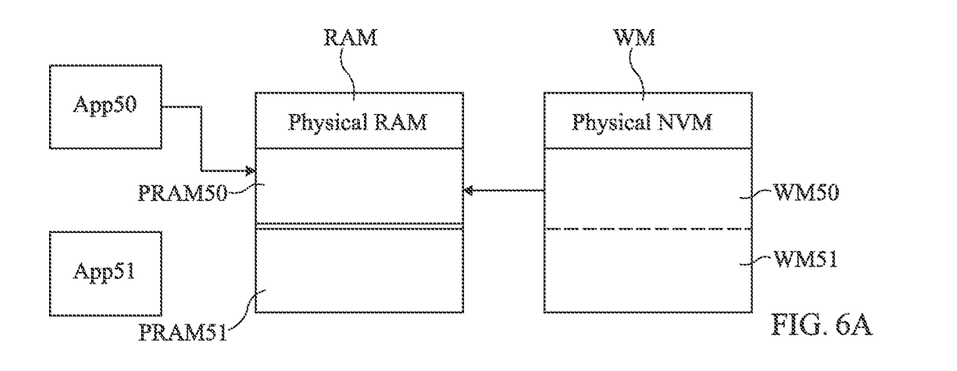
FIGS. 6A, 6B and 6C, collectively FIG. 6, schematically illustrate schematically illustrating in the form of blocks another implementation mode of a method of execution of applications of the embedded electronic system of FIGS. 1 and 2.
Figure 6B:
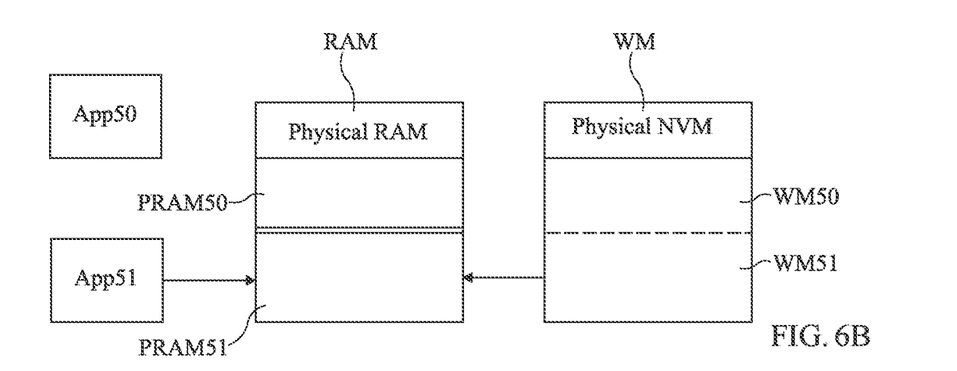
Figure 6C:
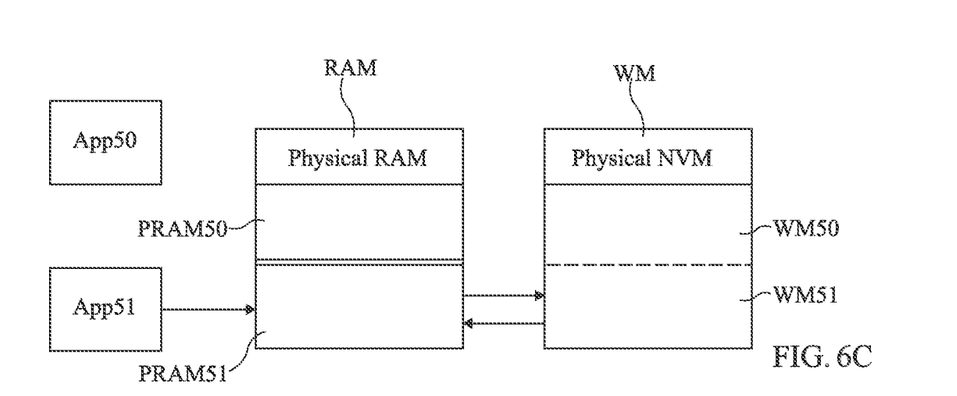

FIG. 6 comprises three views in FIGS. 6A-6C, each illustrating a phase of an implementation mode of a method of execution of applications App50 and App51 of the secure element E described in relation with FIG. 1. The three views more particularly illustrate the use of the non-volatile working memory WM and of the volatile memory RAM of secure element E during the activation of applications App50 and App51.

Applications App50 and App51, according to their implementation, might be located in a same high-level operating system or in two different high-level operating systems.

It is assumed that applications App50 and App51 have already been started by secure element E and are deactivated. All the execution data relative to the starting and to the operation of applications App50 and App51 are respectively stored in areas WM50 and WM51 of non-volatile working memory WM.

According to the example described in FIG. 6, application App50 is a frequent-use application, called resident application hereafter, also described in relation with FIG. 4.

In a first phase (FIG. 6A), resident application App50 requests being run by secure element E. Execution, starting, and operating data relative to application App50 are transferred, downloaded, or loaded into a reserved area PRAM50 of volatile memory RAM, from area WM50 of non-volatile working memory WM. Area PRAM50 is an area of volatile memory RAM always available to store the execution data of application App50, and which cannot be used to store execution data of other applications. Application App50 is then running.

In a second phase (FIG. 6B), application App51 requests being executed by secure element E. Execution, starting, and operating data relative application App51 are transferred, downloaded, or loaded into an area PRAM51 of volatile memory RAM, from area WM51 of non-volatile working memory WM. These data are stored after the execution data relative to application App50 in volatile memory RAM. Application App51 is then running, and application App50 is then at standby.

In a third phase (FIG. 6C), application App51 is still executed by secure element E, but volatile memory PRAM has no further space available to store additional execution data relative to application App51. Since the execution data relative to application App51 cannot be stored in area PRAM50, certain execution data relative to secondary tasks of application App51 are then displaced towards area WM51 of non-volatile working memory WM to free storage space in volatile memory RAM.

In the case where secure element E needs to implement a third application, while volatile memory RAM has no further space available to store execution data, the low-level system (its memory management function MMF) will displace the data of the application, which is not resident, having the oldest execution.

As in the embodiment of FIG. 3, the embodiment of FIG. 6 provide a dedicated area of the physical volatile memory where to keep the execution data of a priority (resident or frequently used) application. Here also, the low-level operating system forbids the unloading of the priority application from its allocated area in the physical volatile memory. Also, as in the embodiment of FIG. 3, both applications are running in a secure environment (are executed by the secure element).

As a variant, a resident application has a portion of the execution data in a dedicated volatile memory (resident) and another portion in the volatile memory shared with other applications. This shared portion may then be transferred into the working memory (non-volatile) when the execution of the task of the concerned application is interrupted or needs more space in the volatile memory.

An advantage of the described embodiments is that all the applications are loaded into a memory seen, by the high-level operating systems of these applications, as a volatile memory. This allows a fast restarting of each application. Furthermore, when an application claims not to be unloaded from its dedicated area of the physical volatile memory, this further speeds up its restarting.

Another advantage of the described embodiments is that a frequent-use application is guaranteed to have space in the voltage memory RAM of the circuit to store its operation execution data therein.

Preferably, the low-level operating systems 113 described in relation with FIG. 2, manage the allocation of the memory areas and their filling with the execution data of the applications (resident or not). More particularly, the low-level operating systems are capable of detecting whether an application is a resident application or not. A secure element E may comprise a plurality of resident applications. Low-level operating systems 113 are further capable of denying the installation of an application as a resident application, for example, if secure element E comprises too many resident applications, particularly when too large a portion, for example, more than half, of volatile memory RAM is reserved to execution data of resident applications. According to a variation, low-level operating systems 113 are capable of configuring the sizes of the portions of volatile memory RAM reserved for execution data of resident applications. In particular, low level operating systems 113 are capable of configuring the size of a portion of the volatile memory RAM reserved for execution data of a resident application, to make it equal to zero.

Further, if the secure element comprises a plurality of resident applications, then the execution data of these resident applications are all stored in a same "resident" portion of volatile memory RAM. When this "resident" portion is full, the execution data relative to secondary tasks of the resident applications are displaced towards non-volatile working memory WM.

Further, if all the resident applications of the secure element are deactivated, the "resident" portion of volatile memory RAM, which is reserved to the execution data of the resident applications, may be used to store execution data of other applications of the secure element. Further, the size of the "resident" portion of volatile memory RAM may be adjusted according to the needs of the resident applications. Further, if a resident application, which requires being executed, does not have enough space to load its data into the "resident" portion of volatile memory RAM, its execution is suspended and it remains in the deactivated state. The concerned application may only be executed when there is enough space in the "resident" portion of volatile memory RAM. As an example, space may be freed by deactivating other resident applications. According to another example, the size of the "resident" portion of volatile memory PRAM may be increased.

According to another embodiment, the execution data of an application which is inactive or at standby which are stored in working memory WM are only transferred into the volatile memory, during a new activation of this application, as and when needed by the application. This action is performed by the low-level operating system and is transparent for the application and the corresponding high-level operating system. Indeed, data displacements between the volatile memory and the non-volatile working memory and conversely are not seen by the high-level operating systems. In the case where the entire volatile memory needs being used during a loading, the low-level operating system previously displaces, towards the working memory, execution data which are considered as the oldest (those which have been used less recently) or the less often used.

An advantage of the disclosed embodiments is that several applications stay present in the volatile memory even when non active. This allows fast toggling from one application to another.

Another advantage of the disclosed embodiments is that the allocation of the volatile memory is "dynamic", i.e., used from an application or another. In other words, execution data of an application are transferred into the non-volatile memory only when space in the volatile memory is needed by a second application.

Various embodiments, aspects, and variants have been described. Those skilled in the art will understand that certain features of these various embodiments, aspects, and variants can be combined and other variants will readily occur to those skilled in the art In particular, the use of the non-volatile working memory has especially been described with the execution of two applications but, in practice, this use may be transposed with the use of more than two applications.

Further, an application might be divided into one or a plurality of resident sub-applications and one or a plurality of non-resident sub-applications. In other words, the resident application might be a portion of another application.

Finally, the practical implementation of the described embodiments and variations is within the abilities of those skilled in the art based on the functional indications given hereabove.

What is claimed is:

1. An embedded electronic system comprising:
   a volatile memory; and
   a processor configured to execute a low-level operating system that manages allocation of areas of the volatile memory to a plurality of high-level operating systems, each high-level operating system executing one or more applications,
   wherein the volatile memory comprises:
   a first portion reserved for execution data of a first application; and
   a second portion reserved for execution data of a second application,
   wherein the low-level operating system is configured to, once the execution data of the first application are loaded in the first portion, forbid unloading of the execution data of the first application from the first portion so that the execution data of the first application remain in the volatile memory in case of a deactivation or of a setting to standby of the first application, and wherein the low-level operating system includes a memory management function configured to forbid access to the execution data of the first application by other applications.

2. The embedded electronic system according to claim 1, wherein the low-level operation system is configured so that the execution data of the first application remain in the first portion when execution data of the second application are loaded in the second portion for execution.

3. The embedded electronic system according to claim 1, wherein the low-level operation system is configured to execute both the first and second applications in a secure environment.

4. The embedded electronic system according to claim 1, wherein the low-level operation system is configured so that the execution data of a plurality of applications are simultaneously present in the volatile memory.

5. The embedded electronic system according to claim 1, wherein the memory management function is configured to adapt a size of the first and second portions of the volatile memory according to different needs of the first and second applications.

6. The embedded electronic system according to claim 1, wherein the system is configured so that a main task of an application is allocated to a volatile memory area during execution of the main task.

7. The embedded electronic system according to claim 1, wherein the low-level operation system is configured so that the applications of a high-level operating system do not have access to the areas of the volatile memory allocated to the one or more applications of another high-level operating system.

8. An electronic system comprising:
a volatile memory;
a non-volatile memory; and
a processor configured to execute a low-level operating system that manages allocation of areas of the volatile memory to a plurality of high-level operating systems, each high-level operating system executing one or more applications,
wherein the volatile memory comprises:
a first portion reserved for execution data of a first application, and
a second portion reserved for execution data of a second application,
wherein the low-level operating system is configured to, once the execution data of the first application are loaded in the first portion, forbid unloading of the execution data of the first application from the first portion so that the execution data of the first application remain in the volatile memory in case of a deactivation or of a setting to standby of the first application,
wherein the low-level operating system is configured to partly transfer execution data of a task of an application from the volatile memory to the non-volatile memory when the execution of the task is interrupted by the execution of a task of another application,
wherein the low-level operating system includes a memory management function configured to forbid access to the execution data of the first application by other applications, and
wherein the volatile memory and the processor are both embedded in an embedded electronic system.

9. The electronic system according to claim 8, wherein the non-volatile memory is external to the embedded electronic system.

10. The electronic system according to claim 9, wherein the low-level operating system is configured to transfer execution code of an application from the non-volatile memory to the volatile memory.

11. The electronic system according to claim 8, wherein the non-volatile memory is also embedded in the embedded electronic system.

12. The electronic system according to claim 11, wherein the system is configured so that execution code of an application remains in the non-volatile memory during the execution of a task.

13. The electronic system according to claim 8, wherein the system is configured so that a non-volatile memory area allocated to a high-level operating system appears as a volatile working memory to the high-level operating system.

14. The electronic system according to claim 13, wherein the high-level operating systems are configured to manage a virtual image of the volatile and non-volatile memories so that the volatile and non-volatile memories appear as one and the same in the virtual image.

15. The electronic system according to claim 8, wherein the low-level operating system is configured to allocate a volatile memory area to the second application while the second application is not executed and to transfer the execution data of the second application to the non-volatile memory when an available volatile memory size is not sufficient for execution of a third application.

16. A method for operating an embedded electronic system that includes a volatile memory, the method comprising:
executing a low-level operating system to manage allocation areas of the volatile memory to a plurality of high-level operating systems, each high-level operating system executing one or more applications;
reserving a first portion of the volatile memory for execution data of a first application;
reserving a second portion of the volatile memory for execution data of a second application;
loading the execution data of the first application to the first portion;
deactivating or setting to standby the first application;
forbidding, by the low-level operating system, unloading of the execution data of the first application from the first portion so that the execution data of the first application remain in the volatile memory after deactivating or setting to standby the first application; and
forbidding, by a memory management function of the low-level operating system, access to the execution data of the first application by applications other than the first application.

17. The method according to claim 16, further comprising loading the execution data of the second application to the second portion, wherein the execution data of the first application remain in the first portion when the execution data of the second application are loaded in the second portion.

18. The method according to claim 16,
wherein execution data of a plurality of further applications are simultaneously present in the volatile memory.

19. The method according to claim 18, further comprising reserving further portions of the volatile memory for execution data of the further applications, wherein the memory management function adapts a size of the first, second, and further portions of the volatile memory according to different needs of the first, second, and further applications.

20. The method according to claim 16, further comprising partly transferring, by the low-level operating system, execution data of a task of the first application from the volatile memory to a non-volatile memory when the execution of the task is interrupted by the execution of a task of another application.

21. The method according to claim 20, wherein the non-volatile memory is external to the embedded electronic system, and wherein the method further comprises transferring execution code of the first application to the volatile memory for its execution.

22. The method according to claim 20, wherein the non-volatile memory is internal to the embedded electronic system, and wherein execution code of an application remains in the non-volatile memory during the execution of a task.

23. The method according to claim 20, wherein reserving the second portion of the volatile memory comprises:
    allocating a volatile memory area to the second application while the second application is not executed; and
    transferring the execution data of the second application to the non-volatile memory when an available volatile memory size is not sufficient for execution of a third application.

24. The method according to claim 16, wherein applications of a high-level operating system do not have access to the areas of the volatile memory allocated to the one or more applications of another high-level operating system.

* * * * *